(12) United States Patent
Thiele

(10) Patent No.: US 6,298,046 B1
(45) Date of Patent: Oct. 2, 2001

(54) ADJUSTABLE BALANCING CIRCUIT FOR AN ADAPTIVE HYBRID AND METHOD OF ADJUSTING THE SAME

(75) Inventor: Alan G. Thiele, San Diego, CA (US)

(73) Assignee: RC Networks, San Diego, CA (US)

( * ) Notice: Subject to any disclaimer, the term of this patent is extended or adjusted under 35 U.S.C. 154(b) by 0 days.

(21) Appl. No.: 09/143,709

(22) Filed: Aug. 28, 1998

(51) Int. Cl.⁷ .................................................. H04M 9/00
(52) U.S. Cl. ......................... 370/282; 379/403; 379/404
(58) Field of Search ........................... 370/276, 282–285; 379/402, 403, 404; 307/98, 99; 333/117, 118, 125–131

(56) References Cited

U.S. PATENT DOCUMENTS

| | | | |
|---|---|---|---|
| 1,957,752 | 5/1934 | Avery | 179/171 |
| 3,848,098 | * 11/1974 | Fowler | 379/402 |
| 3,934,099 | * 1/1976 | Elder, Jr. et al. | 379/402 |
| 3,982,080 | 9/1976 | Ukeiley | 179/170 |
| 4,002,860 | * 1/1977 | Terai et al. | 379/404 |
| 4,096,361 | * 6/1978 | Crawford | 379/403 |
| 4,096,362 | 6/1978 | Crawford | 179/170 |
| 4,103,118 | 7/1978 | Bergman | 179/170 |
| 5,204,854 | 4/1993 | Gregorian et al. | 370/32.1 |
| 5,287,406 | * 2/1994 | Kakuishi | 379/404 |

OTHER PUBLICATIONS

"Generic Requirements for High–Bit–Rate Digital Subscriber Lines," Bellcore Technical Advisory TA–NWT–001210, Issue 1, Oct. 1991.

W. Y. Chen et al., "High–Bit–Rate–Digital Subscriber Line Echo Cancellation," *IEEE Journal on Seclected Areas in Communication*, vol. 9, No. 6, Aug. 1991.

* cited by examiner

Primary Examiner—Salvatore Cangialosi
(74) Attorney, Agent, or Firm—Gray Cary

(57) ABSTRACT

An adjustable balancing circuit (900) for an adaptive hybrid is suitable for use with a two-conductor transmission line in full duplex communications. In a preferred example, the adjustable balancing circuit (900) includes a first impedance structure (902), a second impedance structure (904), a plurality of N resistor-inductor-capacitor (RLC) networks (908), a first plurality of N switch circuits (912), and a second plurality of N switch circuits (914). The first plurality of N switch circuits (912) switchably cascadingly couples the first plurality of N RLC networks (908) to a first end of the first impedance structure (902). The second plurality of N switch circuits (914) switchably couples a first end of the second impedance structure (904) to a first end of each RLC network. When properly configured, the adjustable balancing circuit (900) cancels reflected transmit signals caused by the presence of short bridged taps on the two-conductor transmission line.

34 Claims, 10 Drawing Sheets

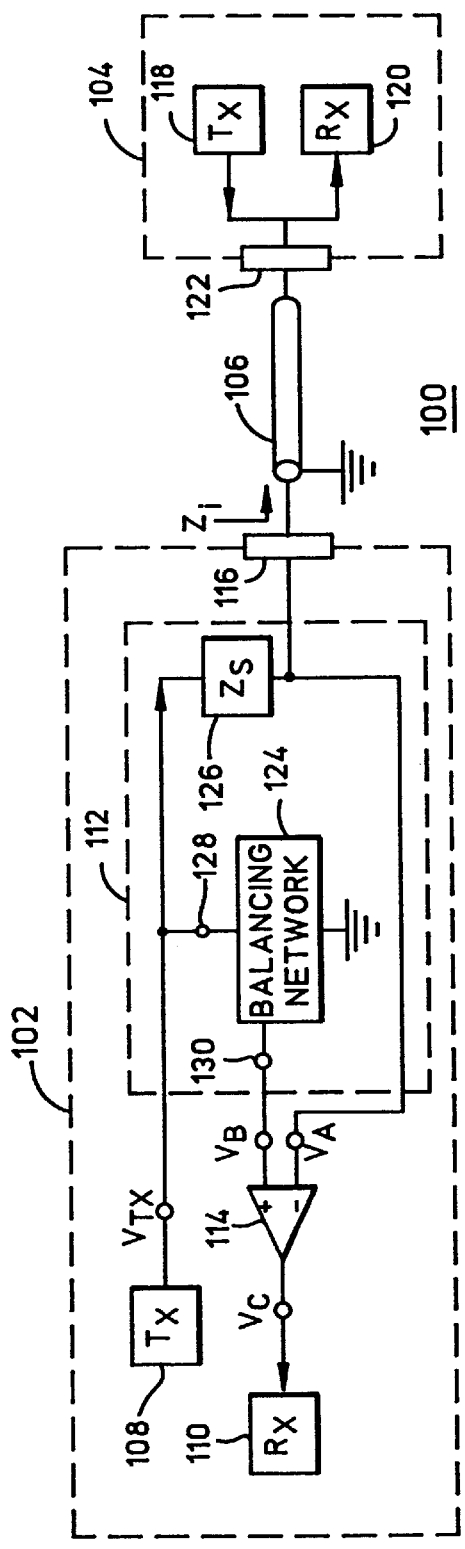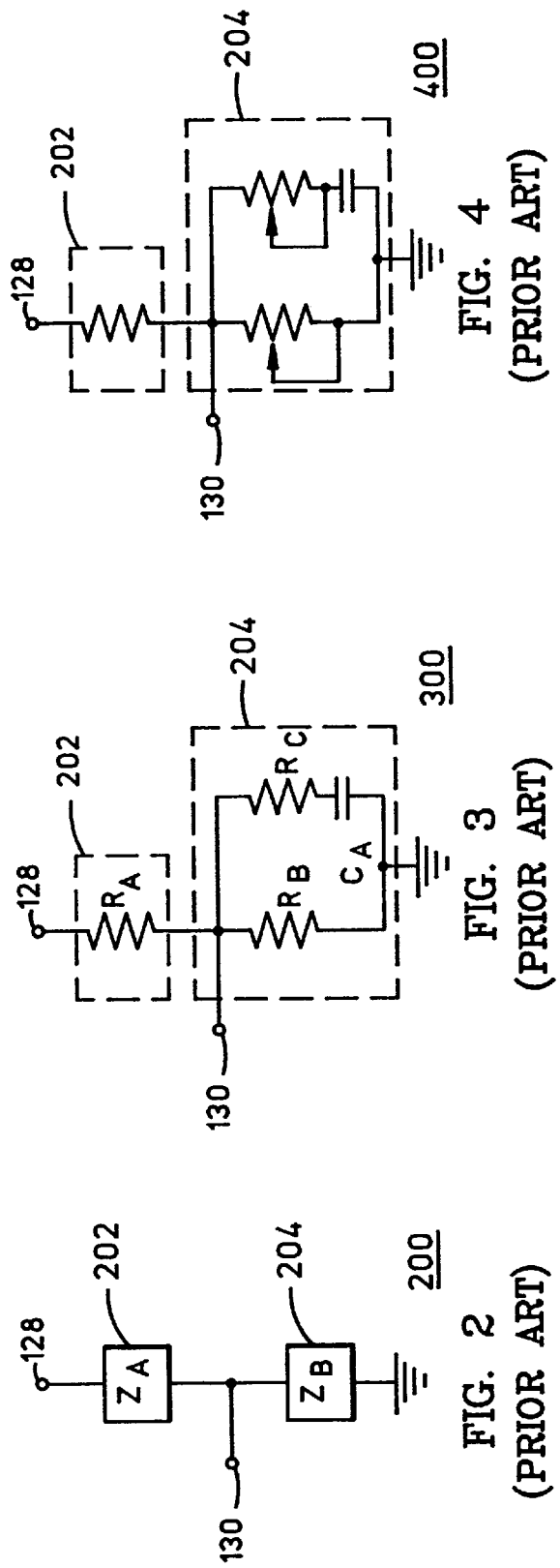
FIG. 1 (PRIOR ART)
FIG. 2 (PRIOR ART)
FIG. 3 (PRIOR ART)
FIG. 4 (PRIOR ART)

ADJUSTABLE BALANCING CIRCUIT FOR AN ADAPTIVE HYBRID AND METHOD OF ADJUSTING THE SAME

FIELD OF THE INVENTION

This invention relates generally to hybrid circuits, and more particularly to adaptive hybrid circuits for use with two-conductor transmission lines in full-duplex communications.

BACKGROUND OF THE INVENTION

In full-duplex communications over a two-conductor transmission line, it is desirable to remove from a composite receive signal that portion due to reflection of a local transmit (Tx) signal, to thereby yield a corrected receive (Rx) signal which closely approximates the true signal broadcasted from a remote transmitter. Such correction is generally accomplished using a signal separator, or "hybrid," and a subtractor.

FIG. 1 shows an abbreviated electrical block diagram of a telecommunications system 100, which includes a telecommunications apparatus 102 operative to communicate with a telecommunications apparatus 104 over a transmission line 106. Telecommunications apparatus 102, which may be a modem, typically includes a transceiver having a transmitter 108 and a receiver 110, a conventional hybrid circuit 112, a subtractor 114, and a line interface 116. Telecommunications apparatus 104 includes the same or similar components, at least a transceiver with a transmitter 118 and a receiver 120 coupled to a line interface 122.

Conventional hybrid circuit 112 typically includes a conventional (2-port) balancing network 124, a transmit source impedance ($Z_S$) 126, which is typically resistive, and a transmission line input impedance ($Z_i$). Circuitry of FIG. 1 is diagramed in an unbalanced (or ground-referenced) form for simplification, although balanced (or ungrounded) circuitry is frequently employed in practice.

Conventional balancing network 124 seeks to develop a voltage $V_B$ which is equal to, in magnitude and phase over the frequency range of interest, a reflected transmit signal component of voltage $V_A$. Thus, a subtractor 114 may yield a subtractor output voltage $V_C = V_A - V_B$ which is equal to the incoming receive signal. For this to work, the voltage transfer function $V_B/V_{Tx}$ of conventional balancing network 124 must be equal to that of the $Z_S$-to-$Z_i$ voltage divider ($Z_i/Z_S + Z_i$). This implies that conventional balancing network 124 must include elements that emulate the magnitude and phase variation behavior of $Z_i$ over the frequency range of interest.

Typically, transmission line 106 is a twisted pair of insulated conductors whose impedance magnitude as a function of frequency behaves as shown in a graph 500 of FIG. 5. More particularly, graph 500 is representative of a twisted pair of insulated copper wires having AWG gauges 19 through 26, typically used in cables for telephony, Integrated Services Digital Network (ISDN), Digital Subscriber Lines (xDSL), and related communication formats. A line impedance curve 502 (shown in solid) represents a long (e.g., 10,000 feet (3048 meters)), unimpaired, terminated transmission line. A line impedance curve 504 (shown in dotted) represents a transmission line impaired by a long bridged tap located near the line's input. These bridged taps are often installed on the main lines in anticipation of line sharing and are typically inaccessible and of unknown length. The phase behavior of such transmission lines is closely and predictably related to the impedance-magnitude behavior and, for brevity, is not separately shown. Conventional hybrids have been designed to accommodate these monotonically-decreasing impedance versus frequency behaviors at low frequencies, such as voiceband frequencies (generally about 300–3000 hertz (Hz) and low data rate communication frequencies (tens of kilohertz (kHz) and below, as in modems operative at 14.4 through 56 kilobits per second (kbps)).

FIGS. 2, 3, and 4 show various conventional balancing networks 200, 300, and 400, respectively, for use in conventional hybrid circuit 112 of FIG. 1. Each of conventional balancing networks 200, 300, and 400 includes an impedance structure 202 and an impedance structure 204, with nodes 128 and 130 for coupling within conventional hybrid circuit 112 as indicated in FIG. 1.

Conventional balancing network 300 of FIG. 3 provides a fixed one-pole, one-zero transfer function, and has been proposed for 784 kbps 2B1Q High-data-rate Digital Subscriber Lines (HDSL) transceivers where the frequencies of primary interest extend to about 200 KHz. See "Generic Requirements for High-Bit-Rate Digital Subscriber Lines," *Bellcore Technical Advisory* TA-NWT-001210, Issue 1, October 1991; and W. Y. Chen et al., "High Bit Rate Digital Subscriber Line Echo Cancellation," *IEEE Journal on Selected Areas in Communications*, Vol. 9, No. 6, August 1991. Conventional balancing network 400 of FIG. 4 implies adjustability of these pole and zero locations, which is described in detail in U.S. Pat. No. 4,096,362 (Crawford). Conventional balancing network 400 may include a magnitude-scaling component to accommodate the presence of bridged-tap line impairments, since the low frequency impact of such impairments simply uniformly scales the impedance magnitude over frequency. Multiple-pole, multiple-zero networks are also available to provide an arbitrarily close match to a given monotonically-decreasing impedance characteristic. Analysis and measurements show that such conventional balancing networks, whether fixedly or adaptively configured, are somewhat useful for unimpaired lines or for impaired lines with long bridged taps.

When one or more short bridged taps are present near a transmission line input, however, a conventional hybrid with one of these conventional balancing networks is found to be highly inadequate—or even counterproductive. In this context, a short bridged tap is one whose length is between roughly one-sixteenth wavelength at the maximum frequency of interest and several thousand feet. For example, short tap lengths would range from about two hundred to several thousand feet for 784-kbps HDSL.

FIG. 6 is a diagram which illustrates such a transmission line environment. A bridged tap 604 is tapped between transmission line sections 602 and 606 of a main line terminated by an impedance 608. Here, bridged tap 604 has a length $Y_2$ located at distance $Y_1$ from the line's input. A distance $Y_T = Y_1 + Y_2$ is the total distance from the line input to the end of the tap. While only a single local tap is shown, multiple local taps may also be present in such an environment.

FIG. 7 is a graph 700 showing some line impedance versus frequency behaviors of the environment shown in FIG. 6. The numerical impedance values shown in graph 700 represent AWG #26 twisted-pair lines. A line impedance curve 702 (shown in solid) represents the behavior of a long unimpaired line; a line impedance curve 704 (shown in dotted) represents the behavior of a long line having a bridged tap of length 800 feet (244 meters) near the line's input; and a line impedance curve 706 (shown in dashed)

represents a long line having a bridged tap of length 1600 feet (488 meters) near the line's input. These tap-impaired impedance behaviors are non-monotonic and oscillatory, and are not adequately emulated by conventional hybrids. The frequencies of impedance minima and maxima depend on tap length. Thus, a conventional hybrid designed for an 800-foot tap would badly mismatch a 1600-foot tap.

FIG. 8 is a graph 800 revealing a further complication in impedance matching. Line impedance curves 802, 804, and 806 of FIG. 8 each correspond to a combined distance of 800 feet (244 meters) from the input to the end of the tap (distance $Y_T$ in the preceding discussion), but with different tap lengths and locations: line impedance curve 802 (shown in solid) represents an 800-foot (244-meter) tap at the input; line impedance curve 804 (shown in dotted) represents a 600-foot (183-meter) tap located 200 feet (61 meters) from the input; and line impedance curve 806 (shown in dashed) represents a 400-foot (122-meter) tap located 400 feet (122 meters) from the input. While the frequencies of the impedance extremes are essentially the same, the extreme impedance values are not. Further analysis and measurements have shown this to be generally true for all bridged tap lengths and locations of interest.

Accordingly, what is needed is a hybrid to accommodate these and similar problems.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein:

FIG. 1 is an abbreviated electrical block diagram of a telecommunication system, which includes a telecommunications apparatus having a conventional hybrid circuit.

FIG. 2 is a first conventional balancing network of the conventional hybrid circuit of FIG. 1.

FIG. 3 is a second conventional balancing network of the conventional hybrid circuit of FIG. 1.

FIG. 4 is a third conventional balancing network of the conventional hybrid circuit of FIG. 1.

DETAILED DESCRIPTION OF THE PREFERRED EMBODIMENTS

The limitations of conventional hybrid circuits for bidirectional high frequency analog or high data rate digital communications over two-conductor transmission lines are overcome by using the principles of the invention to be described herein. In a preferred example, an adjustable balancing circuit of an adaptive hybrid includes a first impedance structure, a second impedance structure, a plurality of N resistor-inductor-capacitor (RLC) networks, a first plurality of N switch circuits, and a second plurality of N switch circuits. The first plurality of N switch circuits switchably cascadingly couples the first plurality of N RLC networks to a first end of the first impedance structure. The second plurality of N switch circuits switchably couples a first end of the second impedance structure to a first end of each RLC network. When properly configured, the adjustable balancing circuit helps generate signals which closely match reflected transmit signals caused by the presence of short bridged taps.

Figure 9:
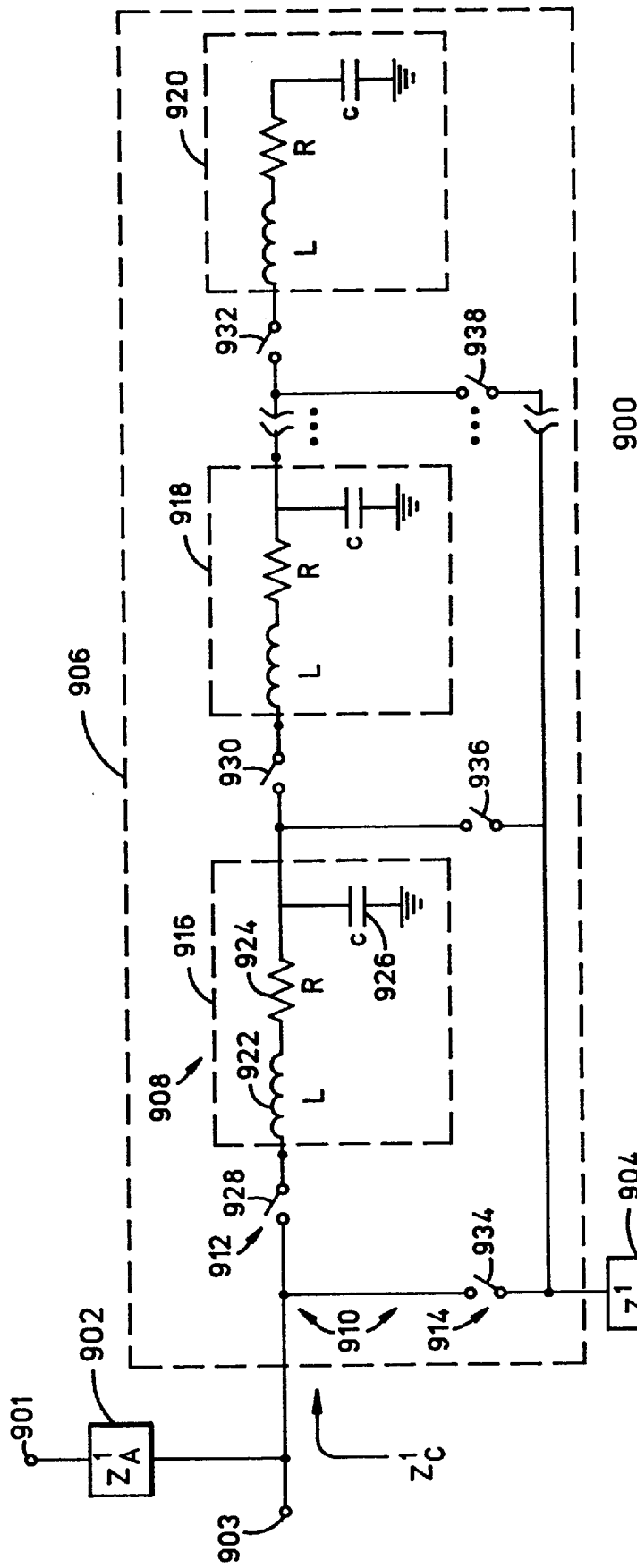
FIG. 9 is a schematic diagram of an adjustable balancing circuit of an adaptive hybrid, shown in an unbalanced form.

FIG. 9 is a schematic diagram of an adjustable balancing circuit 900 of an adaptive hybrid, which is suitable for use with a two-conductor transmission line in full-duplex communications. Adjustable balancing circuit 900 includes an impedance structure 902, an impedance structure 904, and additional circuitry 906 which includes a plurality of N RLC networks 908 (where N is a natural number greater than or equal to two) and switching circuitry 910. Adjustable balancing circuit 900 is shown in an unbalanced or grounded form, although balanced or ungrounded forms are understood and described below in relation to FIGS. 10 and 11.

FIG. 9 shows the plurality of N RLC networks 908 where N is any natural number greater than or equal to two, but also the specific case where N=3. Here, the plurality of N RLC networks 908 includes an RLC network 916, an RLC network 918, and an RLC network 920. Each RLC network of the plurality of N RLC networks 908 includes at least one resistive element (such as a resistor), at least one inductive element (such as an inductor), and at least one capacitive element (such as a capacitor). For example, RLC network 916 includes an inductor 922, a resistor 924, and a capacitor 926 coupled as shown.

Preferably, the resistive, inductive, and capacitive elements are simple, lumped, passive components. Also preferably, the components and component values of each RLC network are substantially the same as the components and the component values of each other RLC network. Each RLC network preferably has an impedance that is substantially the same as an impedance of each other RLC network.

Each of impedance structures 902 and 904 may simply be or include a resistive element, such as a resistor. Alternatively, impedance structures 902 and 904 may be or include impedance structures 202 and 204, respectively, as described and shown in relation to FIGS. 2–4.

As shown in FIG. 9, switching circuitry 910 switchably cascadingly couples the plurality of N RLC networks to a first end of impedance structure 902. Switching circuitry 910 also switchably couples a first end of impedance structure 904 to a first end of each one of RLC networks 916, 918, and 920. As indicated in FIG. 9, the first end of impedance structure 902 is coupled to a node 903 and a second end of impedance structure 902 is coupled to a node 901, where adjustable balancing circuit 900 is suitable for use in an adaptive hybrid circuit 1216 of FIG. 12 as described further below.

Here, switching circuitry 910 includes a plurality of N switch circuits 912 and a plurality of N switch circuits 914. In the embodiment shown, the plurality of N switch circuits 912 includes three switch circuits, switch circuits 928, 930, and 932, and the plurality of N switch circuits 914 includes three switch circuits, switch circuits 934, 936, and 938. Each switch circuit of switching circuitry 910 may be or include any suitable switch or switches, such as a solid-state switch or a relay switch.

As shown in FIG. 9, switch circuit 928 switchably couples the first end of RLC network 916 to the first end of impedance structure 902, switch circuit 930 switchably couples the first end of RLC network 918 to a second end of RLC network 916, and switch circuit 932 switchably couples the first end of RLC network 920 to a second end of RLC network 918. In addition, switch circuit 934 switchably couples the first end of impedance structure 904 to the first end of RLC network 916, switch circuit 936 switchably couples the first end of impedance structure 904 to the first end of RLC network 918, and switch circuit 938 switchably couples the first end of impedance structure 904 to the first end of RLC network 920. For N>3, additional RLC networks and switch circuits may be coupled in the same or similar cascading fashion. It is understood and shown that switch circuits 934, 936, and 938 may switchably couple the first end of impedance structure 904 to the first end of each RLC network through switch circuits 928, 930, 932.

Adjustable balancing circuit 900 preferably has at least two RLC networks that are switchably cascadingly coupled. For example, adjustable balancing circuit 900 at least includes impedance structure 902, RLC network 916 having its first end switchably coupled to the first end of impedance structure 902 (whether switchably coupled directly thereto or through a preceding RLC network), RLC network 918 having its first end switchably coupled to a second end of RLC network 916, and impedance structure 904 having its first end switchably coupled to the first ends of RLC networks 916 and 918. Here, at least four useful switch configurations are available (as will be described below in more detail) to provide at least four unique adjustments of adjustable balancing circuit 900.

Figure 10:
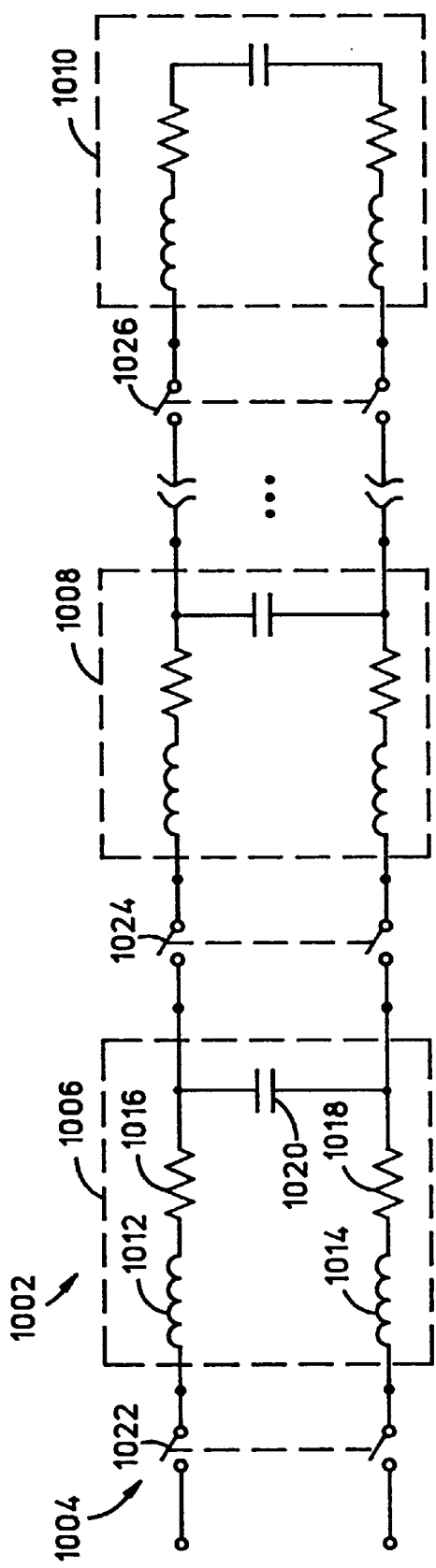
FIG. 10 is a schematic diagram of circuitry of an adjustable balancing circuit of an adaptive hybrid in a balanced form.
Figure 11:
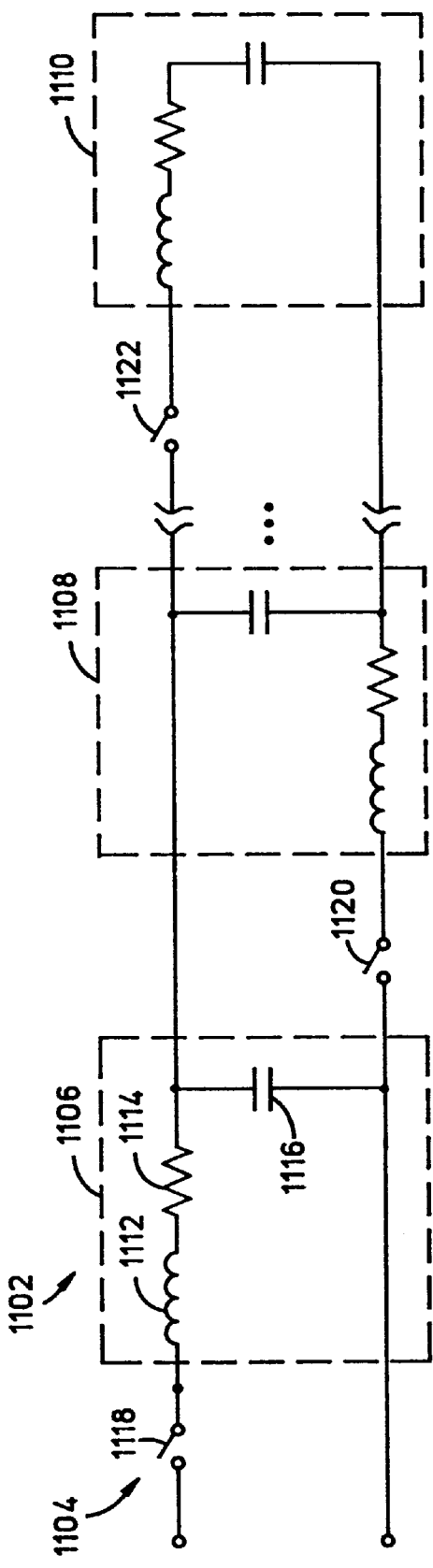
FIG. 11 is a schematic diagram of circuitry of an adjustable balancing circuit of an adaptive hybrid in another balanced form.

FIGS. 10 and 11 show switchably coupled RLC networks in balanced or ungrounded forms (unlike that shown in FIG. 9), both of which may be utilized in adjustable balancing circuit 900 of FIG. 9. FIG. 10 shows more particularly a plurality of N RLC networks 1002 switchably cascadingly coupled through a plurality of N switch circuits 1004. In this embodiment, three RLC networks are shown, RLC networks 1006, 1008, and 1010. Each one of the plurality of RLC networks 1002 here includes at least two inductive elements, at least two resistive elements, and at least one capacitive element. For example, RLC network 1006 includes inductors 1012 and 1014, resistors 1016 and 1018, and a capacitor 1020 coupled as shown. The plurality of N switch circuits 1004 include switch circuits 1022, 1024, and 1026.

In FIG. 11, a plurality of N RLC networks 1102 is switchably cascadingly coupled through a plurality of switch circuits 1104 in a quasi-balanced form. Here, as in FIG. 10, three RLC networks are shown, RLC networks 1106, 1108, and 1110. Each one of the plurality of RLC networks 1102 includes at least one inductive element, at least one resistive element, and at least one capacitor. For example, RLC network 1106 includes an inductor 1112, a resistor 1114, and a capacitor 1116 coupled as shown. The plurality of switch circuits 1104 include switch circuits 1118, 1120, and 1122 switchably coupling RLC networks 1106, 1108, and 1110 as shown. Here, the series RL elements are alternately disposed in upper and lower lines of the cascaded sections.

As described above in relation to FIG. 9, the resistive, inductive, and capacitive elements of FIGS. 10 and 11 are preferably simple, lumped, passive components. Also preferably, the components and component values of each RLC network are substantially the same as the components and the component values of each other RLC network. Each RLC network preferably has an impedance that is substantially the same as an impedance of each other RLC network.

Referring back to FIG. 9, switching circuitry 910 is set to a particular switch configuration by control circuitry (shown and described below in relation to FIG. 12) during an adjustment phase of adjustable balancing circuit 900, preferably using a method shown and described below in relation to FIG. 13. The particular switch configuration determined during the adjustment phase should remain fixed during subsequent telecommunications operation, so long as operating conditions (e.g., operating frequency, tap location, etc.) remain substantially the same. Preferably, in response to a change in conditions, another adjustment phase occurs where the switch configuration may change.

Here, adjustable balancing circuit 900 has a number of useful switch configurations and, more particularly, 1+N(N+1)/2 useful switch configurations. Rules for determining these useful switch configurations of adjustable balancing circuit 900 include: (1) only one of switch circuits 914 may be closed at a time; (2) 0 through N of switch circuits 912 may be closed at a time; (3) if one of switch circuits 912 is closed, then those of switch circuits 912 that precede it must also be closed (i.e., switch circuits 912 are closed such that RLC networks 908 cascadingly connect starting at RLC network 916); and (4) an nth switch circuit of switch circuits 914 may be closed only if the corresponding nth switch circuit of switch circuits 912 is also closed.

As an example, useful switch configurations where N=2 include those described in TABLE 1 below.

| SWITCH CONFIG NUMBER | SWITCH CIRCUIT 928 | SWITCH CIRCUIT 930 | SWITCH CIRCUIT 934 | SWITCH CIRCUIT 936 |
|---|---|---|---|---|
| 1 | 0 | X | 1 | 0 |
| 2 | 1 | 0 | 1 | 0 |
| 3 | 1 | 1 | 1 | 0 |
| 4 | 1 | 1 | 0 | 1 |

Four useful switch configurations where N = 2.
(0 = Open; 1 = Closed; and X = Don't Care)

As another example, useful switch configurations where N=3 those described in TABLE 2 below.

TABLE 2

Seven useful switch configurations where N = 3.

| SWITCH CONFIG NUMBER | SWITCH CIRCUIT 928 | SWITCH CIRCUIT 930 | SWITCH CIRCUIT 932 | SWITCH CIRCUIT 934 | SWITCH CIRCUIT 936 | SWITCH CIRCUIT 938 |
|---|---|---|---|---|---|---|
| 1 | 0 | X | X | 1 | 0 | 0 |
| 2 | 1 | 0 | X | 1 | 0 | 0 |
| 3 | 1 | 1 | 0 | 1 | 0 | 0 |
| 4 | 1 | 1 | 0 | 0 | 1 | 0 |
| 5 | 1 | 1 | 1 | 1 | 0 | 0 |
| 6 | 1 | 1 | 1 | 0 | 1 | 0 |
| 7 | 1 | 1 | 1 | 0 | 0 | 1 |

For N>3, the useful switch configurations are similarly limited as described and are readily apparent to those skilled in the art.

Figure 12:
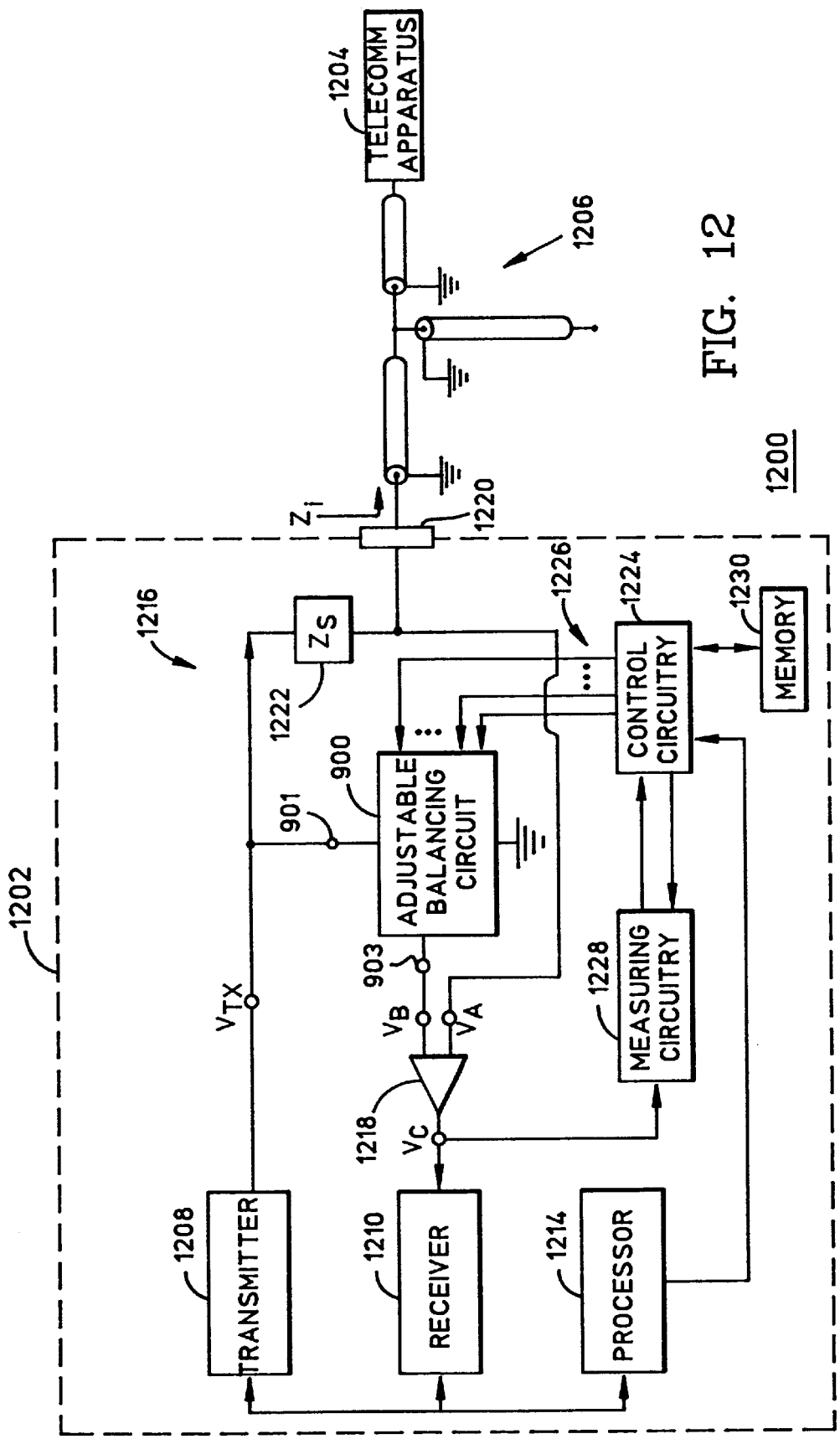
FIG. 12 is a schematic block diagram of a telecommunications system, which includes a telecommunications apparatus utilizing the adaptive hybrid.

FIG. 12 is a schematic block diagram of a telecommunications system 1200. Telecommunications system 1200 includes a telecommunications apparatus 1202 operative to communicate with a telecommunications apparatus 1204. Most importantly, telecommunications apparatus 1202 has an adaptive hybrid circuit 1216 that includes adjustable balancing circuit 900 of FIG. 9 for full-duplex communications over a transmission line 1206 which may be impaired by a short bridged tap.

Telecommunications apparatus 1202, which is a modem or similar apparatus, includes a transceiver having a transmitter 1208 and a receiver 1210, a processor 1214, a subtractor 1218, a line interface 1220, and adaptive hybrid circuit 1216. In this embodiment, adaptive hybrid circuit 1216 includes adjustable balancing circuit 900, an impedance structure 1222 ($Z_S$), control circuitry 1224, and measuring circuitry 1228. Preferably, control circuitry 1224 has access to a memory 1230 for storage of data.

Transmitter 1208, receiver 1210, processor 1214, subtractor 1218, and line interface 1220 may be, for example, typical components found in modems. The transceiver is operative for communications in accordance with xDSL or HDSL standards. Control circuitry 1224 may be or include common switch drivers to drive switching circuitry 910. Preferably, control circuitry 1224 may be or include common suitable software-driven circuitry, such as a microcontroller or microprocessor. Control circuitry 1224 and memory 1230 may include separate components or may be combined as a single component. Also preferably, some or all components of control circuitry 1224, memory 1230, and subtractor 1210 are pre-existing components of telecommunications apparatus 1202 which adaptive hybrid circuit 1214 reuses. As examples, subtractor 1218 may be included in a pre-existing subtractor of telecommunications apparatus 1202; control circuitry 1224 and memory 1230 may be included in (pre-existing) processor 1214; and measuring circuitry 1228 may be included in (pre-existing) receiver 1210.

As shown in FIG. 12, transmitter 1208 has a transmitter output coupled to line interface 1220 through impedance structure 1222 and to adjustable balancing circuit 900 (at node 901 or the second end of impedance structure 902 of FIG. 9). Subtractor 1218 has a subtractor input coupled to line interface 1220 and another subtractor input coupled to adjustable balancing circuit 900 (at node 903 or the first end of impedance structure 902 of FIG. 9). Subtractor 1218 also has a subtractor output coupled to a receiver input of receiver 1210 and to a measuring input of measuring circuitry 1228. Measuring circuitry 1228 is coupled to an input of control circuitry 1224, which is coupled to adjustable balancing circuit 900. More particularly, control circuitry 1224 is coupled to switching circuitry 910 (FIG. 9) through switch control lines 1226 and is operative to configure switching circuitry 910 in various open and closed positions.

Preferable general telecommunications operation of telecommunications apparatus 1202 is described. During an adjustment or calibration phase of adaptive hybrid circuit 1216, control circuitry 1224 configures adjustable balancing circuit 900 so that an impedance that most closely matches the input impedance $Z_i$ is created. To do this, control circuitry 1224 sets switching circuitry 910 (FIG. 9) to the useful switch configurations as described above.

During full-duplex telecommunications operation, transmitter 1208 and receiver 1210 (as well as a transmitter and receiver of telecommunications apparatus 1204) are active and operating. At one subtractor input, subtractor 1218 receives a combined signal ($V_A$) which includes a receive signal (broadcasted from telecommunications apparatus 1204) undesirably mixed with a reflected transmit signal. At the other subtractor input, subtractor 1218 receives a local transmit signal ($V_B$) modified by adaptive hybrid circuit 1216 to closely resemble the reflected transmit signal in magnitude and phase. Subtractor 1218 generates the difference between the combined signal and the modified local transmit signal in an attempt to eliminate the reflected transmit signal and generate a corrected receive signal at its subtractor output. The corrected receive signal is fed into the receiver input of receiver 1210 for reception.

Referring back to FIG. 9, a set of fixed component values for the plurality of N RLC networks 908 is provided for illustrative and comparative purposes. In this example, R=19.44 ohms, L=34.8 microhenries, C=3.14 nanofarads, and $Z_b'$=110 ohms. These RLC values are optimized to emulate line impedance versus frequency behavior for an AWG #26 twisted-pair line, with a resolution of 200 feet (61 meters) of line length. To emulate line impedance over a range of wire gauges, the L and C values may remain fixed while a compromise R value is chosen. In a practical application, the component values would likely be impedance-scaled in consideration of the non-zero output impedance of a transmit line driver and the finite input impedance of the subtractor.

Figure 14:
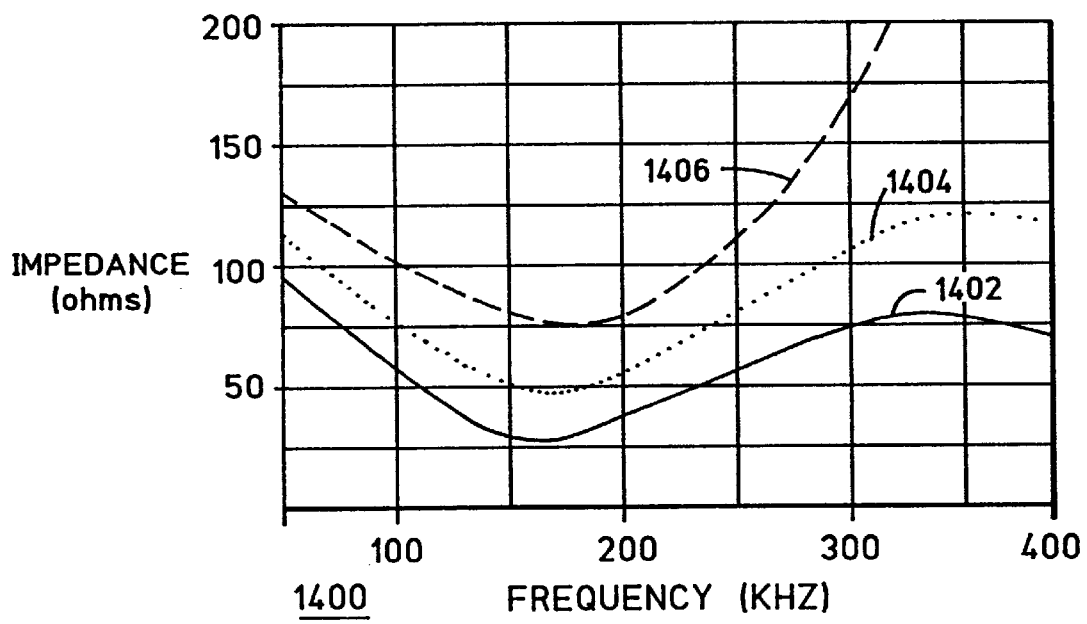
FIG. 14 is a graph showing impedance versus frequency behaviors of the adaptive hybrid.

FIG. 14 shows the magnitude of input impedance $Z_i'$ (that of the $Z_b'$+cascade network) versus frequency using the component values of the preceding paragraph, where N≧4. Impedance curves 1402, 1404, and 1406 of FIG. 14 were obtained by configuring the adaptive hybrid to switch configurations 1, 2, and 3, respectively, shown in TABLE 3 below. Switch configurations 1, 2, and 3 are a subset of eleven useful switch configurations of the adaptive hybrid having four RLC networks. Switch circuits Sx1 correspond to upper switch circuits (e.g., switch circuits 928, 930, 932, etc. of FIG. 9), and switch circuits Sx2 correspond to lower switch circuits (e.g., switch circuits 934, 936, 938, etc. of FIG. 9) of the adaptive hybrid.

TABLE 3

Subset of useful switch configurations where N ≧ 4.

| SW # | S11 | S21 | S31 | S41 | S12 | S22 | S32 | S42 |
|------|-----|-----|-----|-----|-----|-----|-----|-----|
| 1 | 1 | 1 | 1 | 1 | 1 | 0 | 0 | 0 |
| 2 | 1 | 1 | 1 | 1 | 0 | 1 | 0 | 0 |
| 3 | 1 | 1 | 1 | 1 | 0 | 0 | 1 | 0 |

Figure 5:
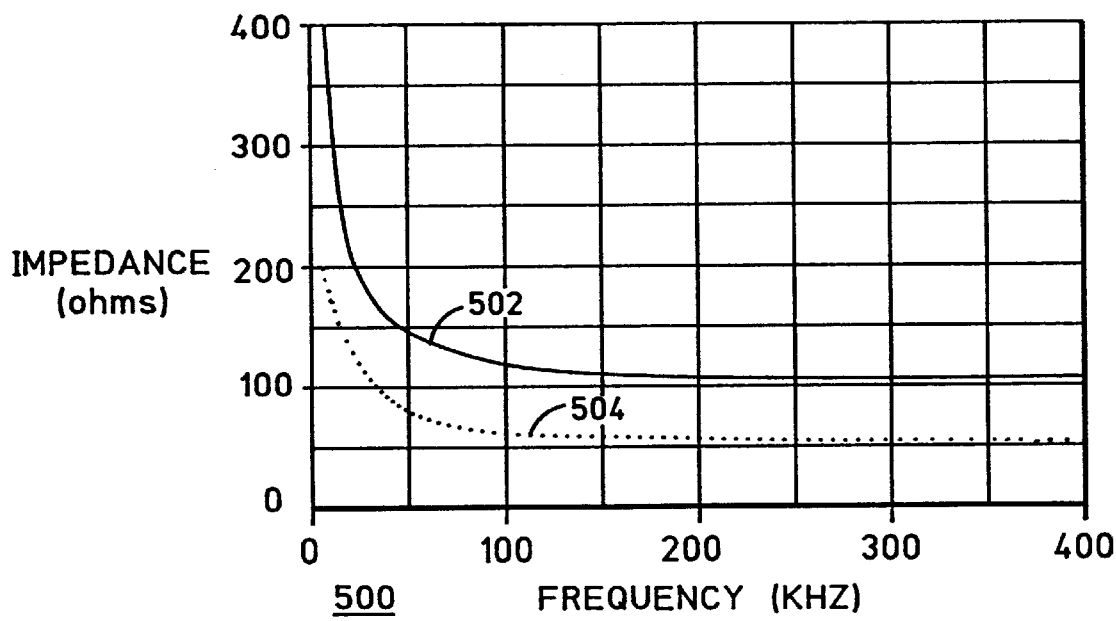
FIG. 5 is a graph showing line impedance versus frequency behaviors, which may be matched by the conventional hybrid circuit of FIG. 1.
Figure 6:
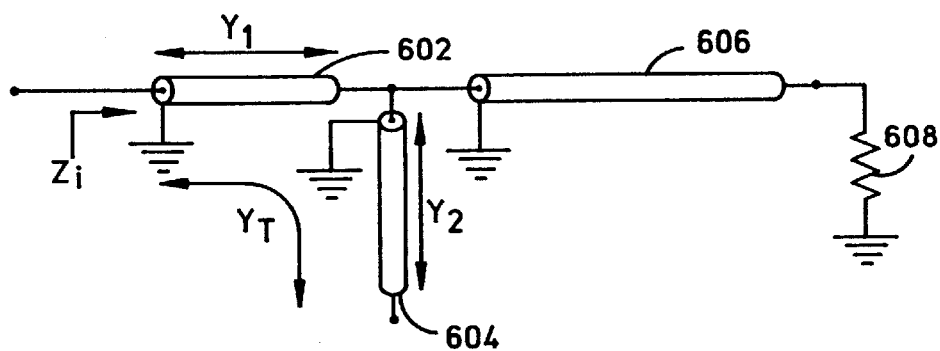
FIG. 6 is an electrical diagram showing a transmission line impaired by a short bridged tap.
Figure 7:
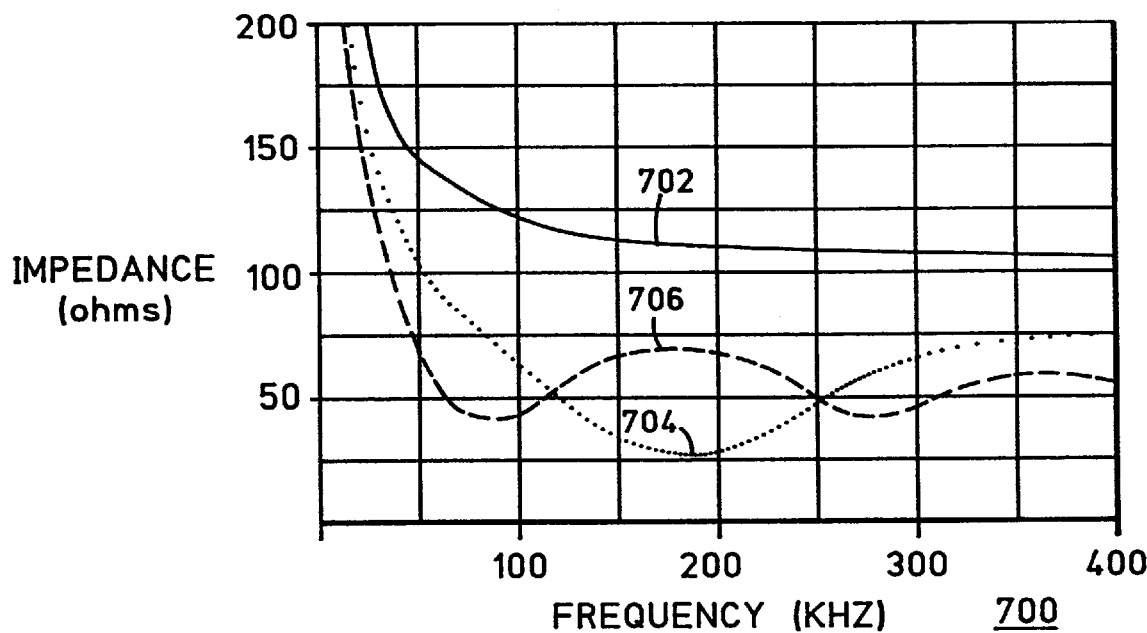
FIG. 7 is a graph showing line impedance versus frequency behaviors as a result of short bridged taps (such as that shown in FIG. 6).
Figure 8:
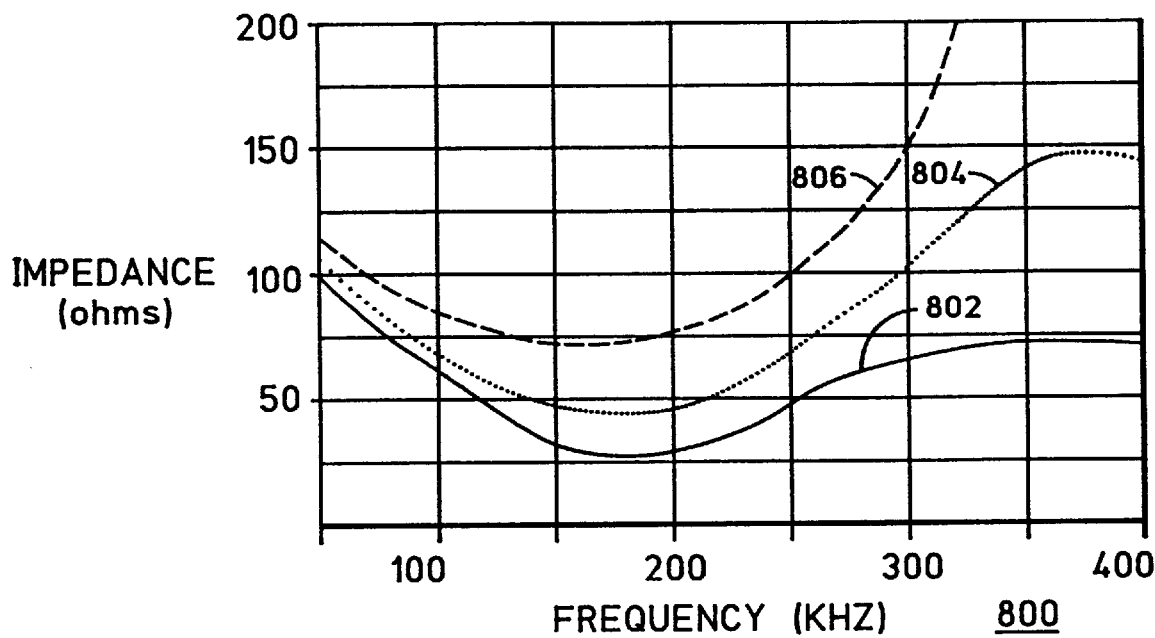
FIG. 8 is a graph showing additional line impedance versus frequency behaviors as a result of short bridged taps (such as that shown in FIG. 6).

Comparison of impedance curves 1402, 1404, and 1406 with line impedance curves 802, 804, and 806 respectively of FIG. 8 shows good emulation of the three short bridged-tap-impaired line impedance behaviors.

Figure 15:
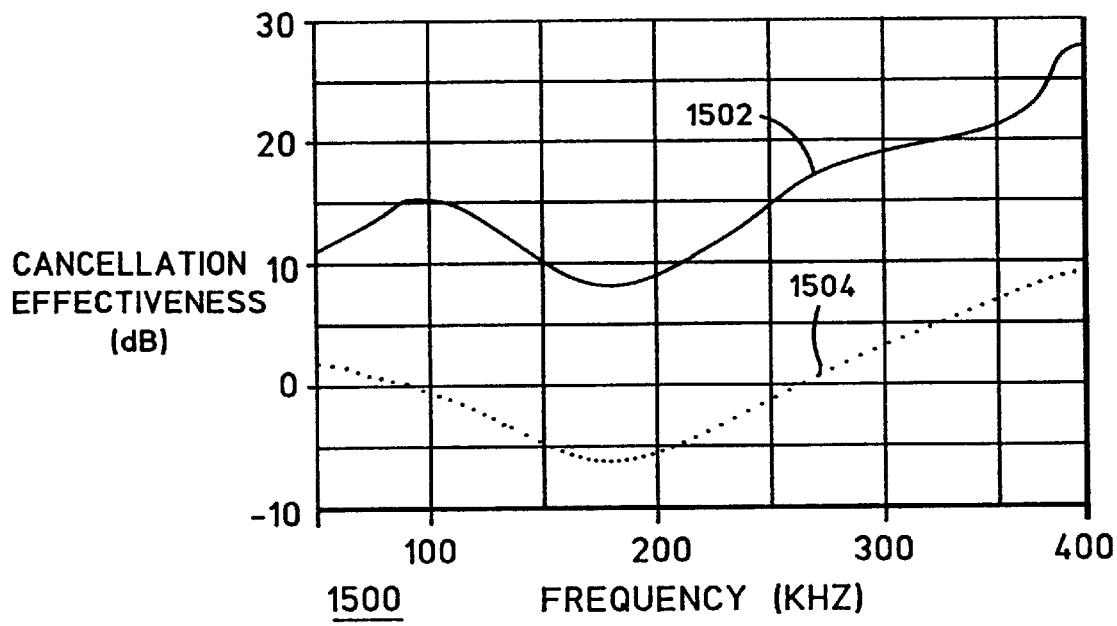
FIG. 15 is a graph comparing cancellation effectiveness (CE) versus frequency behaviors of the adaptive hybrid and a conventional hybrid.

FIG. 15 compares typical cancellation effectiveness (CE) versus frequency results of adaptive hybrid circuit 1216 and a conventional hybrid in the presence of a short bridged tap near the transmission line's input. A hybrid's CE, in decibels, is defined in terms of voltages $V_A$ and $V_B$ developed in the hybrid as CE=−20 log [magnitude of $(1-V_B/V_A)$]. This ultimate performance parameter is also referred to in the art as transhybrid loss or echo return loss. Here, adaptive hybrid circuit 1216 uses the values and switch configuration 1 of TABLE 3 above, with $Z_S$ and $Z_a{}'$ both being resistive and equal to 130 ohms. The conventional hybrid uses balancing network 300 of FIG. 3 with $R_A$=130 ohms, $R_B$=2500 ohms, $R_C$=115 ohms, and $C_A$=8.7 nanofarads, a representative set of values for a conventional fixed hybrid. Here, the transmission line is impaired by an 800-foot (244-meter) bridged tap at its input, as in the remote-terminal end of HDSL Carrier Servicing Area (CSA) Type Test Loop #7 of *Bellcore Technical Advisory* TA-NWT-001210, supra. As shown, adaptive hybrid circuit 1216 provides some 15 dB of improvement in CE over the frequency range shown. In a digital communications transceiver design, this would reduce the dynamic-range requirement of the modem's analog-to-digital (A/D) converter by 2.5 bits and/or enable communication over a substantially longer transmission line.

Figure 13:
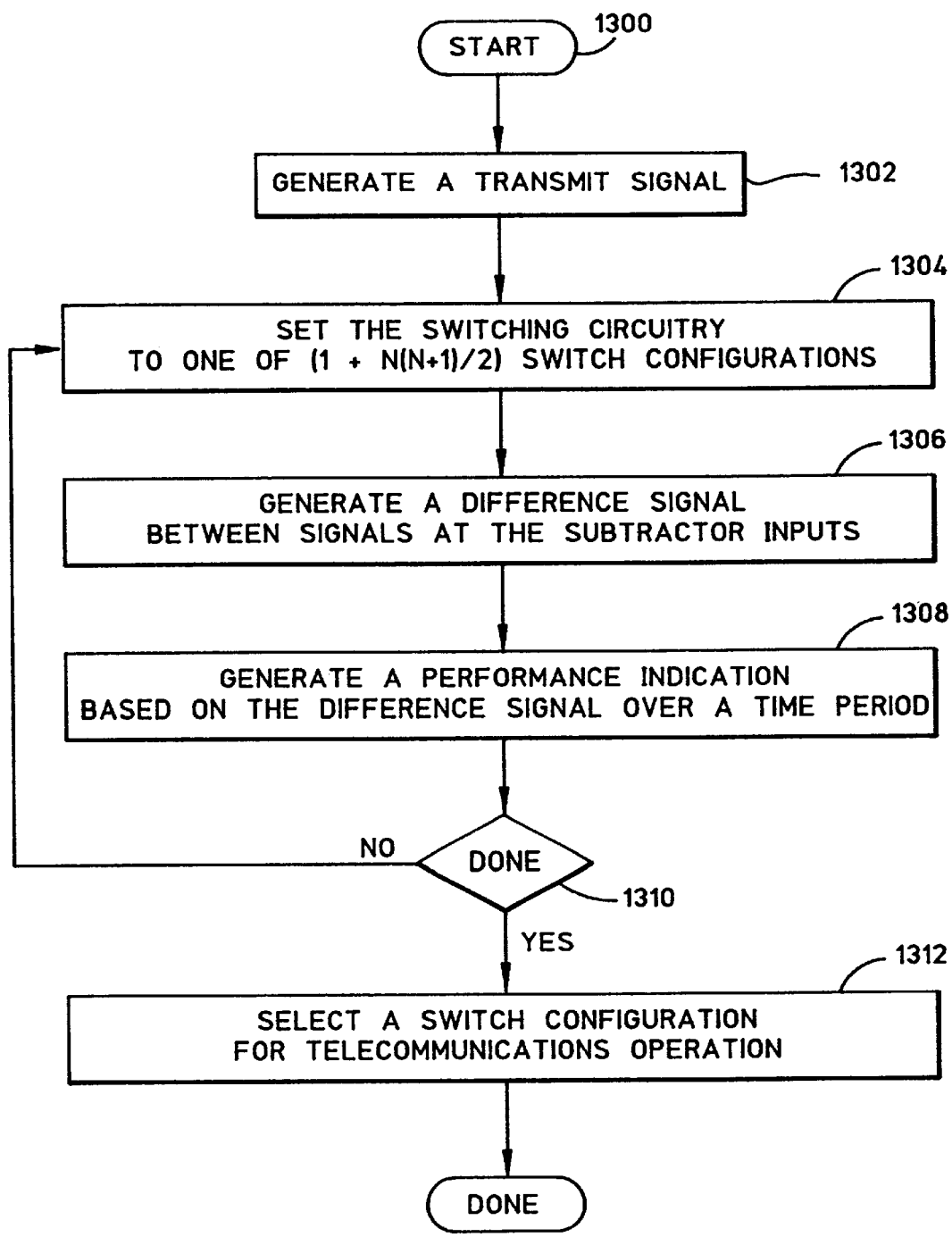
FIG. 13 is a flowchart of a method of adjusting a signal transfer function the adaptive hybrid.

FIG. 13 is a flowchart of a method of adjusting or calibrating a signal transfer function of adaptive hybrid circuit 1216 for telecommunications operation. FIGS. 9 and 12 will be referred to in combination with FIG. 13. The calibration process may commence with instructing signals from processor 1214 to transmitter 1208 and control circuitry 1224. Starting at a step 1300, transmitter 1208 generates a transmit signal (step 1302) which is available at its transmitter output. Preferably, the transmit signal is a pulse sequence chosen to represent, in a suitable-weighted fashion, the frequency range of interest or operation. Control circuitry 1224 sets switching circuitry 910 of adjustable balancing circuit 900 to one of the 1+N(N+1)/2 switch configurations described above (step 1304).

When the transmit signal is being generated and switching circuitry 910 is in one of the switch configurations, subtractor 1218 generates a difference signal between signals at its subtractor inputs (step 1306). This difference signal is available at a subtractor output of subtractor 1218 and is fed into measuring circuitry 1228. Measuring circuitry 1228 generates a performance indication based on this difference signal over a time period (step 1308). Measuring circuitry 1228 may obtain such a performance indication, for example, by rectifying and integrating the difference signal over the time period using a rectifier and an integrator (both not shown), respectively, or by using many other suitable measurement methods and means known in the art.

If, based on this performance indication, it is unnecessary to configure switching circuitry 910 to other switch configurations (step 1310), control circuitry 1224 selects this switch configuration as an appropriate switch configuration for telecommunications operation (step 1312). This will occur, for example, if the performance indication meets or exceeds a threshold performance indication, or if the performance indication is better than a previously obtained performance indication or all other previously obtained performance indications. Thus, at step 1310, control circuitry 1224 may compare the performance indication to a threshold performance indication, or may compare the performance indication to a previously obtained performance indication (e.g., the best previously obtained performance indication) or indications. Using these techniques, control circuitry 1224 may store and read digitized performance indications into and from memory 1230.

If other switch configurations are to be tested at step 1310, the flowchart repeats steps 1304 through 1308, where a different one of the 1+N(N+1)/2 switch configurations is set in step 1304. Preferably, at step 1312, control circuitry 1224 selects the switch configuration that provides the best performance indication for telecommunications operation.

Figure 16:
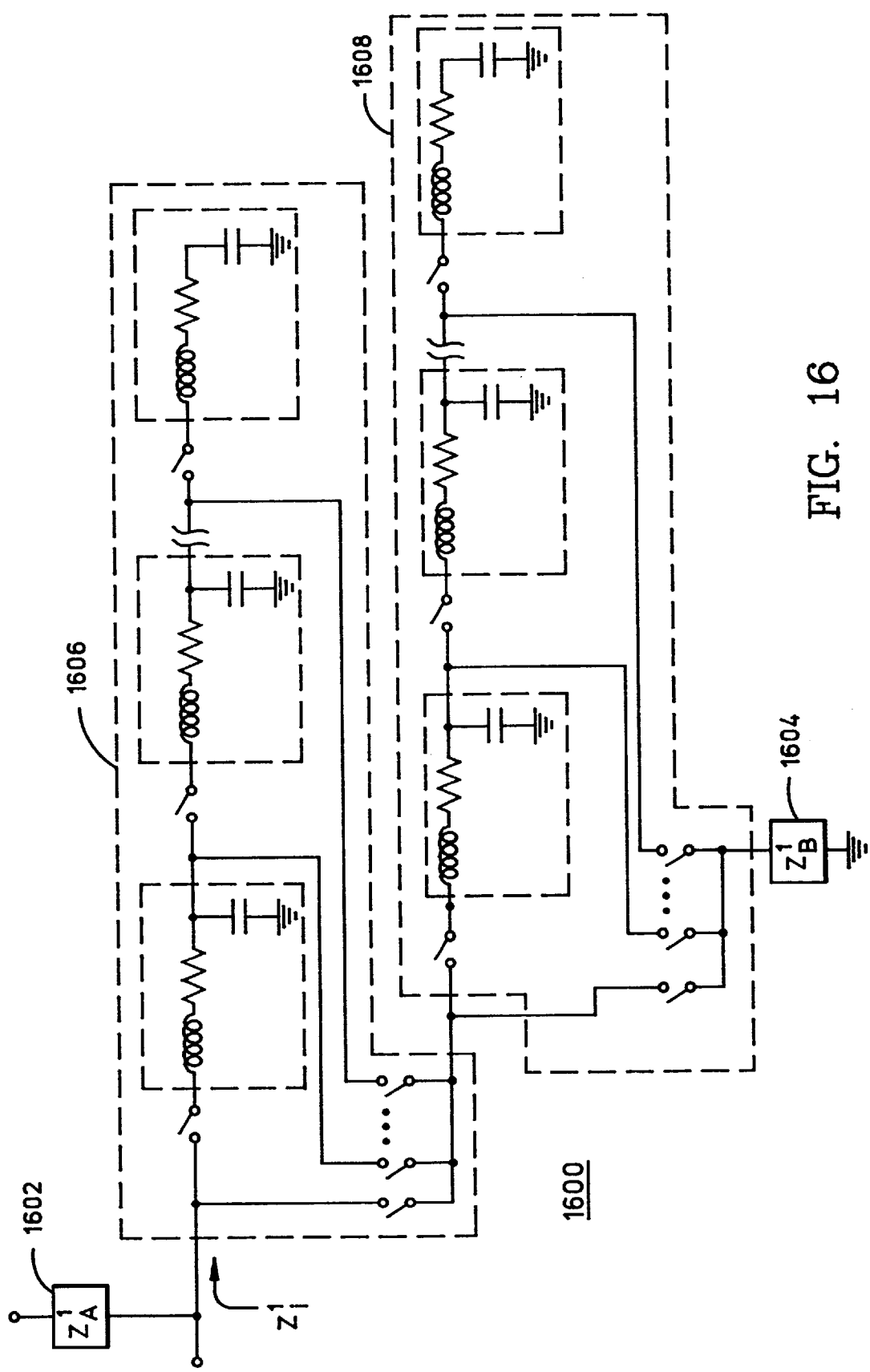
FIG. 16 is a schematic diagram of an first extended embodiment of an adjustable balancing circuit of an adaptive hybrid.

As shown in FIG. 16, such an adjustable balancing circuit may readily be extended to accurately emulate the impedance behavior of a line having more than one bridged-tap impairment by nestingly cascadingly connecting these structures. For example, an adjustable balancing circuit 1600 includes an impedance structure 1602, an impedance structure 1604, and two switchably cascadingly coupled RLC networks, networks 1606 and 1608. As shown, each of networks 1606 and 1608 may be the same as that shown and described in relation to FIG. 9. Such an arrangement is optimal for accommodation of two local impairments, where there are [1+M(M+1)/2][1+N(N+1)/2] sets of useful switch settings.

Figure 17:
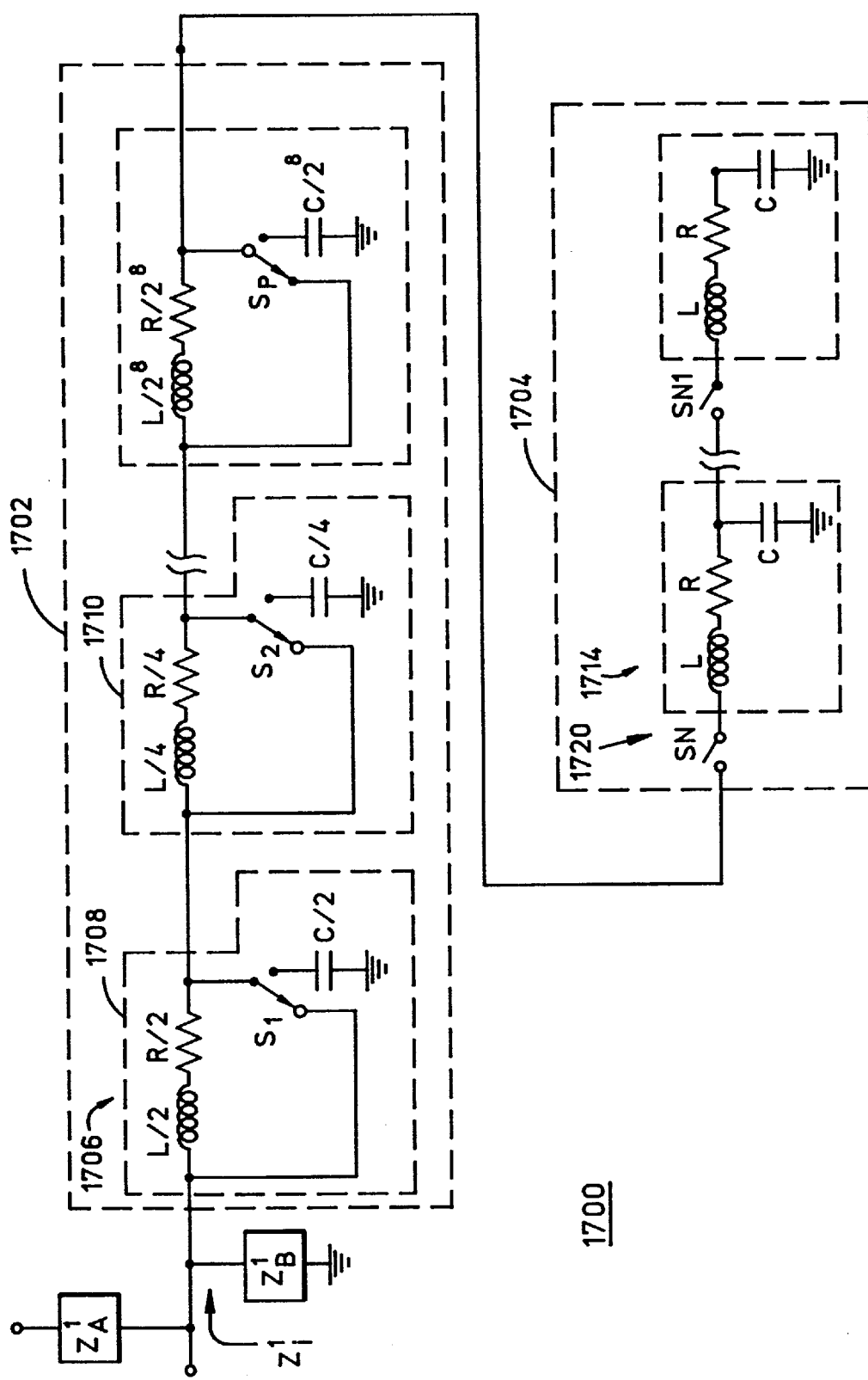
FIG. 17 is a schematic diagram of circuitry of a second extended embodiment of an adjustable balancing circuit of an adaptive hybrid.

As shown in FIG. 17, an adjustable balancing circuit 1700 may have improved resolution (with respect to line length emulation) by adding one or more non-identical switchable sections (as shown in circuitry 1702) to switchably cascadingly coupled RLC networks (as shown in circuitry 1704). Here, a plurality of P switchable binary-weighted (immittance-tapered) sections 1706 are added immediately preceding a first RLC network of a plurality of N RLC networks 1714 switchably cascadingly coupled with a plurality of N switch circuits 1720. Each of the P switchable binary-weighted sections 1706 may include electrical components having relative component values and coupling as shown in FIG. 17. Each of the P switchable binary-weighted sections 1706 may or may not be bypassed, depending on the setting of its associated single-pole, double-throw (SPDT) switch circuit. For binary-weighted component values, a factor of $2^P$ improvement in line-length resolution may be obtained via adaptive configuration of adjustable balancing circuit 1700. For example, where P=2 (a first section 1708 with component values L/2, R/2, and C/2, a second section 1710 with component values L/4, R/4, and C/4, preceding the switchably cascadingly coupled plurality of N RLC networks 1714 with component values R, L, and C), the line-length resolution may be improved by a factor of four. A combination of P tapered sections and N identical sections may be employed to require fewer circuit components and adjustment steps (for emulation of a given maximum line length with a given length resolution) than would be required if only identical networks were employed.

Thus, an adaptive hybrid circuit shown and described herein enhances full-duplex communication over a two-conductor transmission line. The adaptive hybrid circuit adaptively corrects a composite receive signal which is distorted by transmit signal reflections caused by the presence of bridged taps of unknown lengths at inaccessible locations on the transmission line. The adaptive hybrid circuit may employ direct cascading of a determined number of identical, fixed, passive, 2-port networks. The cascading process inherently accommodates the impact of bridged tap length and location on the line's impedance versus frequency behavior. In a digital communications application, such as a modem application, a configuration process of the adaptive hybrid circuit may utilize pre-existing processor and control circuitry.

Such an adjustable balancing circuit is uniquely amenable to hardware implementation, in that a plurality of fixed RLC networks are simply cascaded together and a switch configuration selected during the adaptive configuration process. No component values need be adjusted; impedance-versus-frequency behavior is adjusted via the switchable cascading process.

While the adaptively-adjustable, passive, RLC balancing-network structure is the preferred embodiment of the invention, it will be apparent to skilled practitioners of the art that modifications may be made thereto without departing from the spirit or scope of the appended claims. For example, one might adaptively switch-select one of a plurality of fixed passive RLC structures, each of which emulates a fixed bridged-tap length and location [by producing a non-monotonic or oscillatory voltage transfer ratio versus frequency characteristic], for developing a compensating voltage. More specifically, referring to FIG. 9, a first RLC structure may include RLC network 916, a second RLC structure may include RLC networks 916 and 918 cascadedly connected, a third RLC structure may include RLC networks 916, 918, and 920 cascadedly connected, etc. As another example, one might fixedly couple impedance structure 904 of FIG. 9 to a first end of one of RLC networks 908 (and eliminate switch circuits 934, 936, and 938) to reduce the number of switch configurations.

What is claimed is:

1. An adjustable balancing circuit for an adaptive hybrid, said adjustable balancing circuit comprising:
 a first impedance structure;
 a first resistor-inductor-capacitor (RLC) network, said first RLC network switchably coupled to a first end of said first impedance structure;
 a second RLC network, said second RLC network having a first end switchably coupled to a second end of said first RLC network; and
 a second impedance structure, said second impedance structure having a first end switchably coupled to the first ends of said first and said second RLC networks.

2. The adjustable balancing circuit according to claim 1, wherein said first and said second RLC networks include only fixed, passive electronic components.

3. The adjustable balancing circuit according to claim 1, wherein said first RLC network has a first group of electronic components and said second RLC network has a second group of electronic components that are substantially the same as said first group of electronic components.

4. The adjustable balancing circuit according to claim 1, wherein said first RLC network has a first group of fixed, passive electronic components and said second RLC network has a second group of fixed, passive electronic components that are substantially the same as said first group of fixed, passive electronic components.

5. The adjustable balancing circuit according to claim 1, wherein said first RLC network has a first impedance and said second RLC network has a second impedance that is substantially the same as the first impedance.

6. The adjustable balancing circuit according to claim 1, wherein said adjustable balancing circuit is configured to have a non-monotonic impedance versus frequency behavior.

7. The adjustable balancing circuit according to claim 1, further comprising:
 switching circuitry, said switching circuitry switchably coupling the first end of said first RLC network to the first end of said first impedance structure, said switching circuitry switchably coupling the first end of said second RLC network to the second end of said first RLC network, said switching circuitry switchably coupling the first end of said second impedance structure to the first ends of said first and said second RLC networks.

8. The adjustable balancing circuit according to claim 1, further comprising:
 switching circuitry, said switching circuitry switchably coupling the first end of said first RLC network to the first end of said first impedance structure, said switching circuitry switchably coupling the first end of said second RLC network to the second end of said first RLC network, said switching circuitry switchably coupling the first end of said second impedance structure to the first ends of said first and said second RLC networks; and
 control circuitry, said control circuitry coupled to and operative to configure said switching circuitry to one of a plurality of switch configurations.

9. The adjustable balancing circuit according to claim 1, further comprising:
 switching circuitry, including:
  a first switch circuit, said first switch circuit switchably coupling the first end of said first RLC network to the first end of said first impedance structure;
  a second switch circuit, said second switch circuit switchably coupling the first end of said second RLC network to the second end of said first RLC network;
  a third switch circuit, said third switch circuit switchably coupling the first end of said second impedance structure to the first end of said first RLC network;
  a fourth switch circuit, said fourth switch circuit switchably coupling the first end of said second impedance structure to the first end of said second RLC network;
 control circuitry, said control circuitry operative to configure said switching circuitry to at least one of:
  a first switch configuration where said first and said fourth switch circuits are open and said third switch circuit is closed;
  a second switch configuration where said first and said third switch circuits are closed, and said second and said fourth switch circuits are open;
  a third switch configuration where said first, said second, and said third switch circuits are closed and said fourth switch circuit is open; and
  a fourth switch configuration where said first, said second, and said fourth switch circuits are closed and said third switch circuit is open.

10. The adjustable balancing circuit according to claim 1, further comprising:
 a third RLC network, said third RLC network having a first end switchably coupled to a second end of said second RLC network; and wherein said second impedance structure is switchably coupled to the first end of said third RLC network.

11. The adjustable balancing circuit according to claim 1, further comprising:
   a third RLC network, said third RLC network having a first end switchably coupled to a second end of said second RLC network;
   switching circuitry, including:
      a first switch circuit, said first switch circuit switchably coupling the first end of said first RLC network to the first end of said first impedance structure;
      a second switch circuit, said second switch circuit switchably coupling the first end of said second RLC network to the second end of said first RLC network;
      a third switch circuit, said third switch circuit switchably coupling the first end of said third RLC network to the second end of said second RLC network;
      a fourth switch circuit, said fourth switch circuit switchably coupling the first end of said second impedance structure to the first end of said first RLC network;
      a fifth switch circuit, said fifth switch circuit switchably coupling the first end of said second impedance structure to the first end of said second RLC network;
      a sixth switch circuit, said sixth switch circuit switchably coupling the first end of said second impedance structure to the first end of said third RLC network;
   control circuitry, said control circuitry operative to configure said switching circuitry to at least one of:
      a first switch configuration where said first, said fifth, and said sixth switch circuits are open, and said fourth switch circuit is closed;
      a second switch configuration where said first and said fourth switch circuits are closed, and said second, said fifth, and said sixth switch circuits are open;
      a third switch configuration where said first, said second, and said fourth switch circuits are closed, and said third, said fifth, and said sixth switch circuits are open;
      a fourth switch configuration where said first, said second, and said fifth switch circuits are closed, and said third, said fourth, and said sixth switch circuits are open;
      a fifth switch configuration where said first, said second, said third, and said fourth switch circuits are closed, and said fifth and said sixth switch circuits are open;
      a sixth switch configuration where said first, said second, said third, and said fifth switch circuits are closed, and said fourth and said sixth switch circuits are open; and
      a seventh switch configuration where said first, said second, said third, and said sixth switch circuits are closed, and said fourth and said fifth switch circuits are open.

12. An adaptive hybrid circuit, comprising:
   a first impedance structure;
   a second impedance structure;
   a plurality of N resistor-inductor-capacitor (RLC) networks;
   a first plurality of N switch circuits, said first plurality of N switch circuits switchably cascadingly coupling said plurality of N RLC networks to a first end of said first impedance structure; and
   a second plurality of N switch circuits, said second plurality of N switch circuits switchably coupling a first end of said second impedance structure to a first end of each RLC network of said plurality of N RLC networks.

13. The adaptive hybrid circuit according to claim 12, further comprising:
   a first RLC network and N−1 remaining RLC networks of said plurality of N RLC networks;
   a first switch circuit and N−1 remaining switch circuits of said first plurality of N switch circuits; and
   wherein said first plurality of N switch circuits switchably cascadingly couples said plurality of N RLC networks such that said first switch circuit switchably couples a first end of said first RLC network to the first end of said first impedance structure and each one of said N-1 remaining switch circuits switchably couples a first end of one of N-1 remaining RLC networks to a second end of another one of said RLC networks.

14. The adaptive hybrid circuit according to claim 12, wherein said adaptive hybrid circuit is configured to have a non-monotonic impedance versus frequency behavior.

15. The adaptive hybrid circuit according to claim 12, wherein each RLC network of said plurality of N RLC networks include only fixed, passive electronic components.

16. The adaptive hybrid circuit according to claim 12, wherein $N \geq 2$ and said adaptive hybrid further comprises:
   a first switch circuit of said first plurality of N switch circuits, said first switch circuit switchably coupling a first end of a first RLC network to the first end of said first impedance structure;
   a second switch circuit of said first plurality of N switch circuits, said second switch circuit switchably coupling a first end of a second RLC network to a second end of said first RLC network;
   a third switch circuit of said second plurality of N switch circuits, said third switch circuit switchably coupling the first end of said second impedance structure to the first end of said first RLC network;
   a fourth switch circuit of said second plurality of N switch circuits, said fourth switch circuit switchably coupling the first end of said second impedance structure to the first end of said second RLC network;
   control circuitry, said control circuitry coupled to and operative to configure said first and said second pluralities of N switch circuits to at least one of:
      a first switch configuration where said first and said fourth switch circuits are open and said third switch circuit is closed;
      a second switch configuration where said first and said third switch circuits are closed, and said second and said fourth switch circuits are open;
      a third switch configuration where said first, said second, and said third switch circuits are closed and said fourth switch circuit is open; and
      a fourth switch configuration where said first, said second, and said fourth switch circuits are closed and said third switch circuit is open.

17. A telecommunications apparatus, comprising:
   a line interface;
   a transmitter, said transmitter having a transmitter output coupled to said line interface;
   a first impedance structure, said first impedance structure having a first end coupled to said transmitter output;
   a plurality of resistor-inductor-capacitor (RLC) networks, said plurality of RLC networks switchably cascadingly coupled to a second end of said first impedance structure; and a second impedance structure, said second impedance structure having a first end switchably coupled to a first end of each RLC network of said plurality of RLC networks.

18. The telecommunications apparatus according to claim 17, wherein said telecommunications apparatus comprises a modem.

19. The telecommunications apparatus according to claim 17, wherein said transmitter is operative to transmit in accordance with Digital Subscriber Lines (xDSL) standards.

20. The telecommunications apparatus according to claim 17, wherein said transmitter is operative to transmit in accordance with High-data-bit-rate Digital Subscriber Lines (HDSL) standards.

21. The telecommunications apparatus according to claim 17, further comprising:
  a third impedance structure, said third impedance structure coupled between said transmitter output and said line interface.

22. The telecommunications apparatus according to claim 17, wherein said line interface is adapted for coupling with a two-conductor transmission line.

23. The telecommunications apparatus according to claim 17, further comprising:
  a subtractor, said subtractor having a first input coupled to said line interface and a second input coupled to the second end of said first impedance structure.

24. The telecommunications apparatus according to claim 17, further comprising:
  a subtractor, said subtractor having a first input coupled to said line interface and a second input coupled to the second end of said first impedance structure; and
  a receiver, said receiver having a receiver input coupled to a subtractor output of said subtractor.

25. The telecommunications apparatus according to claim 17, further comprising:
  switching circuitry, said switching circuitry switchably cascadingly coupling said plurality of RLC networks to the second end of said first impedance structure and switchably coupling the first end of said second impedance structure to the first end of each RLC network; and
  control circuitry, said control circuitry coupled to and operative to configure said switching circuitry.

26. The telecommunications apparatus according to claim 17, further comprising:
  a third impedance structure, said third impedance structure coupled between said transmitter output and said line interface;
  switching circuitry, said switching circuitry switchably cascadingly coupling said plurality of RLC networks to the second end of said first impedance structure and switchably coupling the first end of said second impedance structure to the first end of each RLC network;
  a subtractor, said subtractor having a first input coupled to said line interface and a second input coupled to the second end of said first impedance structure;
  measuring circuitry, said measuring circuitry coupled to a subtractor output of said subtractor; and
  control circuitry, said control circuitry coupled to said switching circuitry and operative to configure said switching circuitry in response to said measuring circuitry.

27. The telecommunications apparatus according to claim 17, further comprising:
  a subtractor, said subtractor having a first input coupled to said line interface and a second input coupled to the second end of said first impedance structure;
  a receiver, said receiver having a receiver input coupled to a subtractor output of said subtractor;
  switching circuitry, said switching circuitry switchably cascadingly coupling said plurality of RLC networks to the second end of said first impedance structure and switchably coupling the first end of said second impedance structure to the first end of each RLC network; and
  control circuitry, said control circuitry coupled to said switching circuitry, said control circuitry coupled to said switching circuitry and operative to configure said switching circuitry to at least two of a plurality of switch configurations.

28. A telecommunications system operative for full duplex communications over a two-conductor transmission line, said telecommunications system comprising:
  a first telecommunications apparatus, including:
  a first line interface, said first line interface adapted for coupling with a two-conductor transmission line;
  a first receiver, said first receiver having a first receiver input coupled to said first line interface;
  a first transmitter, said first transmitter having a first transmitter output coupled to said first line interface through a first impedance structure;
  a second telecommunications apparatus, including:
  a second line interface, said second line interface adapted for coupling to a two-conductor transmission line;
  a second receiver, said second receiver having a second receiver input;
  a second transmitter, said second transmitter having a second transmitter output coupled to said second line interface through a second impedance structure;
  a subtractor, said subtractor having a first subtractor input coupled to said second line interface and a subtractor output coupled to said second receiver input;
  an adaptive hybrid circuit, including:
    a third impedance structure, said third impedance structure having a first end coupled to said second transmitter output and a second end coupled to a second subtractor input of said subtractor;
    at least two resistor-inductor-capacitor (RLC) networks, said at least two RLC networks including a first RLC network and a second RLC network;
    a first group of at least two switch circuits, said first group of at least two switch circuits switchably cascadingly coupling said at least two RLC networks to said first subtractor input, at least so that a first end of said first RLC network is switchably coupled to said first subtractor input and a first end of said second RLC network is switchably coupled to a second end of said first RLC network;
    a fourth impedance structure;
    a second group of at least two switch circuits, said second group of at least two switch circuits switchably coupling a first end of said fourth impedance structure to a first end of each of said at least two RLC networks; and
    control circuitry, said control circuitry coupled to said first and said second groups of at least two switch circuits.

29. The telecommunications system according to claim 28, wherein said adaptive hybrid circuit of said second telecommunications apparatus is switchably configured to have a non-monotonic impedance versus frequency behavior.

30. The telecommunications apparatus according to claim 28, wherein said adaptive hybrid circuit of said second telecommunications apparatus further comprises:
- a first switch circuit of said first group of at least two switch circuits;
- a second switch circuit of said first group of at least two switch circuits;
- a third switch circuit of said second group of at least two switch circuits;
- a fourth switch circuit of said second group of at least two switch circuits;
- wherein said control circuitry is operative to configure said first and said second groups of at least two switch circuits to at least one of:
  - a first switch configuration where said first and said fourth switch circuits are open and said third switch circuit is closed;
  - a second switch configuration where said first and said third switch circuits are closed, and said second and said fourth switch circuits are open;
  - a third switch configuration where said first, said second, and said third switch circuits are closed and said fourth switch circuit is open; and
  - a fourth switch configuration where said first, said second, and said fourth switch circuits are closed and said third switch circuit is open.

31. A method of adjusting a signal transfer function of an adaptive hybrid of a telecommunications apparatus, the telecommunications apparatus including a transmitter, a subtractor, a first impedance structure, a second impedance structure, a plurality of resistor-inductor-capacitor (RLC) networks, switching circuitry, and control circuitry, the first impedance structure having a first end coupled to a transmitter output of the transmitter and a second end coupled to a first subtractor input of the subtractor, the plurality of RLC networks switchably cascadingly coupled to the first subtractor input through the switching circuitry, the second impedance structure switchably coupled to a first end of each RLC network through the switching circuitry, the method comprising:
- generating, with the transmitter, a transmit signal at the transmitter output;
- setting, with the control circuitry, the switching circuitry to a first switch configuration;
- generating, with the subtractor, a first difference signal between signals at the first and the second subtractor inputs when the switching circuitry is in the first switch configuration and the transmit signal is being generated;
- generating a first performance indication based on the first difference signal over a first time period;
- setting, with the control circuitry, the switching circuitry to a second switch configuration that is different from the first switch configuration;
- generating, with the subtractor, a second difference signal between signals at the first and the second subtractor inputs when the switching circuitry is in the second switch configuration and the transmit signal is being generated;
- generating a second performance indication based on the second difference signal over a second time period; and
- selecting, with the control circuitry, one of the first and the second switch configurations for telecommunications operation.

32. The method according to claim 31, wherein generating the first performance indication includes rectifying and integrating the first difference signal over the first time period, and generating the second performance indication includes rectifying and integrating the second difference signal over the second time period.

33. The method according to claim 31, further comprising at least one of:
- comparing the first and the second performance indications; and
- comparing at least one of the first and the second performance indications to a threshold performance indication.

34. The method according to claim 31, further comprising:
- comparing the first and the second performance indications; and
- wherein selecting one of the first and the second switch configurations for telecommunications operation includes selecting the first switch configuration in response to the first performance indication being indicative of better performance than the second performance indication.

* * * * *

UNITED STATES PATENT AND TRADEMARK OFFICE
CERTIFICATE OF CORRECTION

PATENT NO. : 6,298,046 B1
DATED : October 2, 2001
INVENTOR(S) : Thiele

Page 1 of 1

It is certified that error appears in the above-identified patent and that said Letters Patent is hereby corrected as shown below:

Column 17,
Line 1, please delete [apparatus] and insert -- system --.

Signed and Sealed this

Fourteenth Day of May, 2002

*Attest:*

*Attesting Officer*

JAMES E. ROGAN
*Director of the United States Patent and Trademark Office*